March 7, 1961

KIYOSHI INOUE 2,974,216

SPARK DISCHARGE CONTOURING MACHINE USING WIRE ELECTRODE

Filed Jan. 5, 1959

INVENTOR.
KIYOSHI INOUE

BY Reynolds, Beach & Christensen

ATTORNEYS

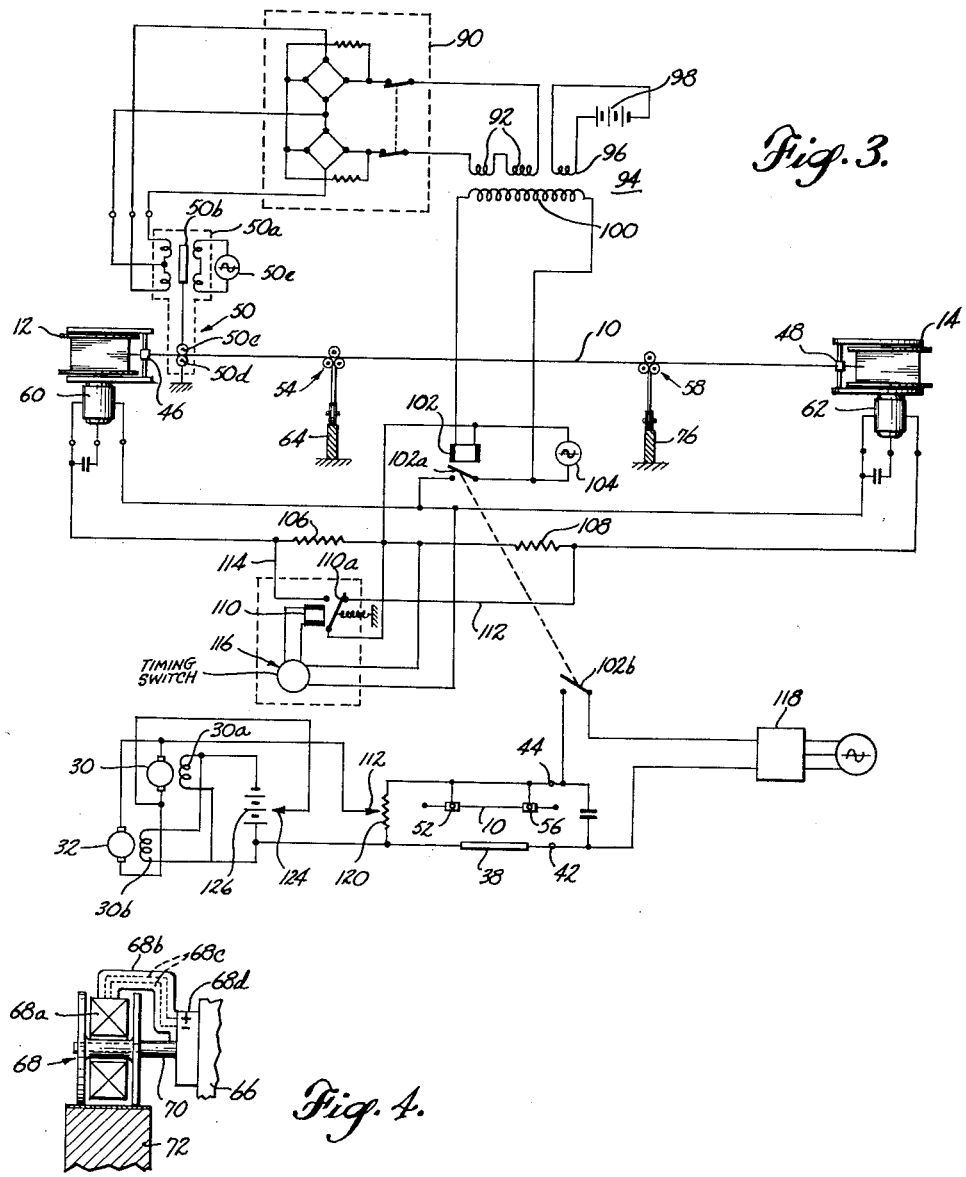

United States Patent Office 2,974,216
Patented Mar. 7, 1961

2,974,216

SPARK DISCHARGE CONTOURING MACHINE USING WIRE ELECTRODE

Kiyoshi Inoue, 182 Yoga Tamagawa, Setagaya-ku, Tokyo, Japan

Filed Jan. 5, 1959, Ser. No. 784,982

16 Claims. (Cl. 219—69)

This invention relates to the cutting or machining of metal, and more particularly to a new and improved apparatus for cutting metal by electric spark discharge in order to impart a predetermined contour or surface configuration thereto. The invention is herein illustratively described by reference to the presently preferred embodiment thereof; however, it will be recognized that certain modifications and changes therein with respect to details may be made without departing from the underlying essentials involved.

The present invention makes possible the cutting and contouring of metal parts and assemblies in a precision operation, the results of which are very difficult if not impossible to achieve by ordinary or conventional methods. For example, while the invention is not limited to specialized cutting or contouring problems, one particularly difficult type of machining operation is that of contouring honeycomb cell structures in which metal foil or thin sheets are joined together in strips to form a honeycomb assembly which is very susceptible to collapse under small amounts of mechanical cutting pressure and which is highly susceptible to burning and damage when conventional electric arc cutting methods are attempted. The present invention makes possible cutting large honeycomb structures to a given contour as well as the cutting and contouring of highly brittle and otherwise difficult materials to work such as germanium. Another operation readily performable by the present invention is the machining of very narrow slots in large and small objects, and the machining of such slots in planes which may be flat, curved, twisted, or combinations thereof.

A specific object of the invention is a practicable and efficient contouring machine operating on the electric spark discharge or metal erosion principle, wherein the electrode may be of any desired working length and wherein such electrode, though consumable by the very nature of the process, may be so maintained as to remove a relatively large amount of work material, hence perform a relatively large cutting operation, without interruption and without loss of accuracy due to excessive erosion of the electrode.

One prior approach to the problem of contouring metal parts and structures by the electric spark discharge technique was to prepare an electrode preformed to the desired ultimate contour of the workpiece itself and to sweep such electrode through and hence across the workpiece by a slow and progressive process by which all of the metal in the path of the electrode, hence usually all of that on one side of the contoured surface being formed, is removed by the advancing electrode. Such a process was not only expensive from the standpoint of electrical energy consumption and wasted valuable materials but presented problems of cost and delay in the laborious manufacture of the contoured electrode and in the maintenance of an accurate contour of the electrode edge despite continuing erosion thereof occasioned by the process.

The present invention achieves not only the foregoing objectives but provides a relatively simple and fully automatic contouring machine which is relatively rapid in its operation, in terms of usual rate of production of spark discharge machining apparatus, and which is capable of extremely great accuracy even in shipment of large size involving long electrode spans sufficient to cut a wide workpiece in one stroke.

Another object of this invention is to provide such a contouring machine which with the same basic and inexpensive electrode stock is adapted to cut workpieces of various sizes and to impart any desired obtainable contour thereto by the substitution of different templates defining the desired different contoured relationships.

Other specific objects reside in the provision of practical and efficient spark discharge contouring apparatus attaining the foregoing purposes by means which are suitably adapted to maintain the power spark gap clearances between the electrode and the opposing work surface being eroded, which permits use of a consumable wire electrode without loss of accuracy or unduly frequent interruptions yet which maintains an accurate relationship between the location and directional disposition of the wire in relation to the guiding templates controlling its movement, and which automatically maintains a predetermined tension in the wire and tests the diameter thereof for capability of withstanding such tension as a condition to the continuance of the process. The entire apparatus lends itself to a relatively compact and simple organization of components and to a simple arrangement for immersing the operational region of the workpiece in a suitable dielectric liquid necessary for performance of the spark erosion process.

One feature of the invention resides in the provision of contouring or machining apparatus involving a wire electrode, the effective life of which may be made as great as desired while preserving the accuracy of the work performed, by winding such wire on two reversibly driven spools or reels which are spaced apart in order to stretch the wire under tension therebetween as the working portion of the electrode. The tension is established by differential torque motors operatively connected to the respective spools, the motors driving oppositely to each other and one such motor having greater torque than the other at a given time so as to wind the wire on one spool from the other. Reversal of the torque relationship causes the spools to rewind such wire back on the one spool from which it was previously unwound, this process being repeatable indefinitely until the wire has been eroded to a reduced thickness requiring a change of wire. As a result there are no delays for rewinding the wire and the wire may be as long as desired. Moreover, on any one sweep of any one section of wire through the work the wire is eroded very little, so that there is no problem of wire size changing materially in moving from one end of the slot to the other, as there might be if a very slow wire movement were used in order to conserve the wire in one sweep thus to save rewind time. Hence by simple arrangements, one piece of wire may be used to perform many jobs without any attention and the process may be a continuous one without interruption, whereas in prior proposals the problem of erosion of the wire necessitated frequent changes of wires and often discard of wires which still had useful life potential.

Another feature resides in the mounting of the respective spools on separate portions of the carriage mechanism to move bodily in directions perpendicular to the stretch of the wire and also to the direction of progress of the carriage in relation to the workpiece, thereby to produce contour cuts in accordance with templates guiding such transverse movement of the spools. Such templates may be identical or different, depending upon whether contour is required only in the direction of progress of the carriage along the templates or whether transverse progress or slope is also required. Furthermore, the workpiece support may be movable in relation to the templates, such as by rotating the support about an axis perpendicular to the plane defined by the stretch of wire and the direction of travel of the carriage, in order to achieve still other types of contours more complex in nature.

These and other features, objects and advantages of the invention will become more fully evident from the following description thereof by reference to the accompanying drawings.

Figure 3 is a schematic diagram of the electrical control system for the apparatus.

Figure 4 is a sectional view of a template tracer wheel assembly.

Figure 1:
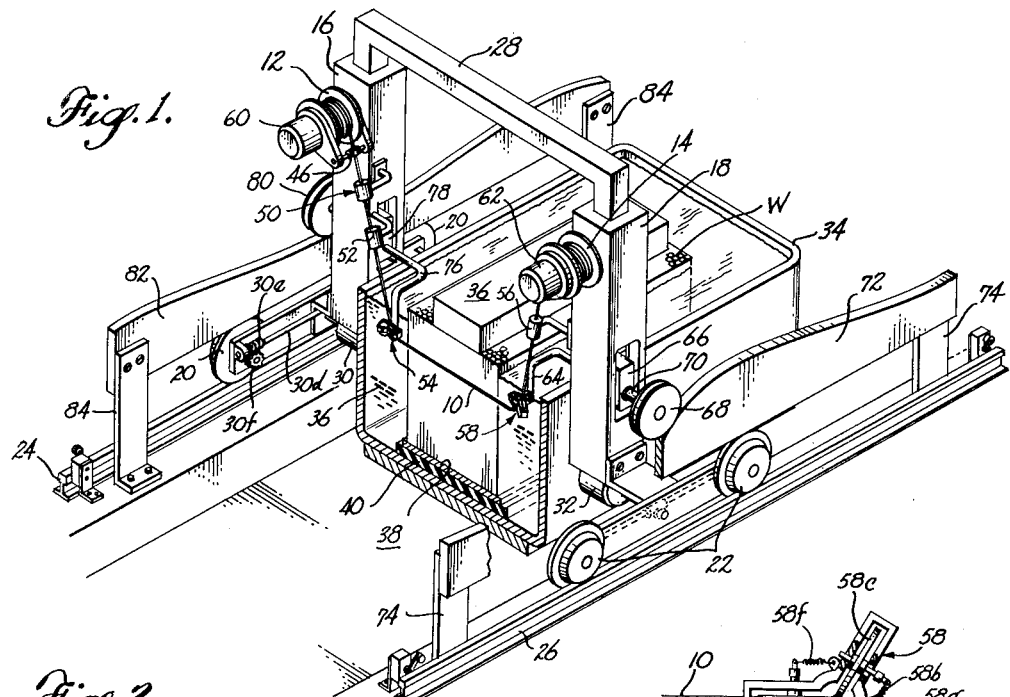
Figure 1 is a simplified perspective view of a contouring machine employing the novel features of the invention, with parts broken away to reveal details.

Referring to the drawings, the wire electrode 10 comprises a long piece of wire, such as piano wire or other suitable metal wire, one end of which is wound on the spool 12 and the other end of which is wound on the spool 14, usually with many turns of wire wound on the spools in comparison to the number represented in the length of the stretch of wire extending between the spools. The respective spools 12 and 14 are mounted on the posts 16 and 18 comprising side portions of a carriage having the opposite sets of wheels 20 and 22 which roll on the straight parallel tracks 24 and 26, respectively. The carriage frame includes a rigid member 28 which bridges between the side portions of the posts 16 and 18 in order to assure that the sides of the carriage advance at precisely the same rates. Further assurance of this is achieved by driving both sets of carriage wheels 20 and 22 with similar servomotors 30 and 32 which are energized in like manner (Figure 3). If desired, arrangements may be made for interconnecting the shafts of these motors although such is usually not necessary and is not shown in the views. The servomotor 30 has a shaft 30a carrying a worm 30b which engages with a worm wheel 30c. The worm wheel 30c is on the intermediate portion of the shaft 30d which carries a worm 30e at each end engaging a worm wheel 30f. The worm wheels 30f are on the shafts which drive the carriage wheels 20 thereby to advanve the carriage as the motor 30 turns. A similar driving arrangement with parts correspondingly numbered is associated with the servomotor 32 and the carriage wheels 22 at hte opposite side of the carriage. If desired, the wheels 20 and 22 may be magnetized in order better to insure positive traction with the tracks 24 and 26. For reasons which will subsequently appear, it is desired to have a continuous engagement with these tracks which would be difficult if the tracks were in the form of gear racks and the wheels were in the form of gears, due to back-lash resulting from providing the usual clearance necessary between gears along the pitch line in order to prevent binding. Also for this same reason, the drive connections between the motors 30 and 32 and the carriage wheels are worm-and-wheel type connections avoiding any back-lash which might prevent the servomotors from providing the necessary closely accurate control of feed rate of the wire electrode so as to maintain a given spark gap clearance at all times.

Between the opposite side portions of posts 16 and 18 of the carriage is located a work support which in this instance is preferably in the form of an open-top liquid storage tank 34 which is filled with a dielectric liquid, such as transformer oil or kerosene, 36, to a level in the tank above which the wire electrode 10 will be working. Usually suitable means (not shown) will be provided for circulating the liquid into and through the cutting region for removing the erosion products as they are formed. A workpiece W, such as a block made up of honeycomb cell structure formed of thin sheet metal is placed in the tank 34 in the path of the wire electrode which extends perpendicularly to the plane defined by the carriage tracks 24 and 26. Usually in the case of light-weight work material such as a honeycomb structure, a stabilizing weight 36 or hold-down may be placed upon the top of the workpiece in order to hold it firmly in place in the tank and also in order to insure reliable electrical contact between the bottom surface thereof and an electrode plate 38 upon which it rests. Underlying the electrode plate 38 is or may be a dielectric insulating plate 40 which in the case of a metal tank insulates the workpiece from the surface of the tank. The electrode or contact plate 38 is connected to one terminal 42 and the electrode wire 10 to the other terminal 44 (Figure 3) of the spark discharge energy source in the system, to be described in connection with Figure 3.

Because usually a large amount of electrode wire is wound on one or both of the spools 12 and 14 at any given time, it is desirable to take measures which insure that the wire will not be kinked or weakened by excessively sharp bending as it leaves one spool and as it is wound upon the other spool. This is accomplished in an effective and simple manner by causing the wire to pass through a level-wind mechanism 46 associated with the spool 12 and a similar level-wind mechanism 48 associated with the spool 14. These level-wind mechanisms may be generally similar in nature and operation to those customarily used on well-known types of level-wind fishing reels. The wire, upon leaving the spool 12, passes through a thickness gauging device 50 to be described in connection with Figure 3, thence through a brush or electric contact device 52 from which it extends to and through a guide sheave assembly 54. The wire stretching from the spool 14 likewise extends through an electrical brush unit 56 and guide sheave assembly 58 similar, respectively, to the units 52 and 54 on the opposite side of the workpiece. The electric brush units 52, 56 are preferably mounted in stationary positions on the posts 16 and 18, although they may be movable if desired in accordance with movement of the level-wind traversing elements (not separately shown) or with movement of the tracer mechanism which supports the respective guide sheaves 54 and 58, to be described. The wire electrode 10 extends in a straight line under tension between the guide sheave units 54 and 58 which are so positioned that the wire traces the desired cutting path through the workpiece W in a region immersed in the dielectric liquid 36.

The desired tension is maintained in the electrode wire 10 by torque motors 60 and 62 which reversibly drive the respective wire spools 12 and 14 in a manner and in accordance with means to be described in connection with Figure 3, so that the wire is first wound on one spool and unwound from the other and then is rewound on the second spool from the first, recurringly, as long as the wire remains of sufficient thickness and strength to perform its function. It is important that predetermined tension be maintained in the wire in order to keep the working electrode 10 stretch thereof as straight as possible and thereby permit maintaining a constant working clearance in the spark gap between the surface of the wire and the opposing surface of the work as well as permit achieving a high degree of accuracy in the contouring cut thereby achieved.

The guide sheave unit 58 is positioned in the space within the tank between the column 18 and the adjacent side of the workpiece W on the end of a supporting arm 64 which projects into that space from a carriage element 66 which is suitably mounted on ball bearings and guided to move in a lineal path up and down in the post 18. The vertically adjusted position of the carriage element 66 is instantaneously determined by a template follower wheel 68 rotationally mounted on a shaft 70 which projects laterally from the outer side of the post 18 in order to position a follower wheel 68 in contact with one guide or template 72. The template 72 extends along the length of the track 26 and is carried by supports 74. Its upper surface contacted by the follower wheel 66 is shaped in accordance with the desired shape to be imparted to the adjacent edge of the surface contour being cut by the wire electrode 10 in the workpiece W. A similar supporting arm 76 carried the guide sheave unit 54, projecting from a carriage element 78 which runs on ball bearings in a suitable guide arrangement in the post 16. A follower wheel 80 associated with the carriage element 78 engages a template 82 carried by supports 84 in adjacent relationship to the track 24. The template 82 may or may not correspond in shape to the template 72 depending upon whether or not the contoured cut is to have curvature or slope only in the direction parallel to the tracks 24 and 26 or whether it is also to have transverse contour or slope by relative vertical movements effective between the guide sheaves 54 and 58.

As shown in Figure 4, while it is possible to rely upon gravity to assure the continued contact of the follower wheels 68 and 80 with their respective template surfaces, it is also desirable to assure positively that such contact will be maintained despite any possible tendency for the carriage runners 66 and 78 to "hang up" in the guides along which they move in the respective posts, due to friction or otherwise. For this purpose, if desired, these wheels may be made of ferromagnetic material, as may the templates upon which they ride and the wheel hubs or axles surrounded by an electrical coil or inductor such as the coil 68a surrounding the wheel 68 in Figure 3. The coil may then be energized through leads 68c from a source of magnetizing current 68d, with the coil supported by an arm 68b mounted on the carriage element 66 in order to avoid the necessity of brushes which feed the coil while the follower wheel runs on the template 72. Such magnetization of the wheel will hold it firmly in contact with the templates without imposing any frictional restraint or otherwise interfering with the delicate vertical movements of the guide arms 64 and 76 controlling the position of the wire electrode 10.

Figure 5:
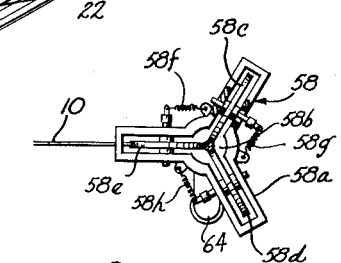
Figure 5 is a sectional view of a guide sheave unit.

Details of the preferred form of guide sheave unit 54 or 58 appear in Figure 5 wherein such unit comprises a frame such as 58a having equiangularly arranged arms which are slotted and with the slots opening into a common central bore 58b which is aligned with the direction of extent of the wire coming from or leading to the adjacent spool 12 or 14. In the arm slots are journaled the individual guide sheaves 58c, 58d and 58e, respectively, on axes which are perpendicular to the extent of the arms. The respective peripheries of these guide sheaves run into near tangency to each other, allowing enough space therebetween to permit passage of the electrode wire 10 between them as shown. Take-up springs 58f, 58g and 58h and associated anchors therefor are connected to the projecting axle ends of the respective guide sheaves in order to draw the guide sheaves into firm contact with the wire electrode as it passes between them. Slight clearance between the guide sheave axles and the journal holes (not shown) in the arms through which they pass is afforded to permit some degree of movement of the guide sheaves for the take-up action effected by the springs. This permits the guiding action of the sheaves to remain uniformly effective throughout progressive reduction in the diameter of the wire electrode 10 as it is eroded over a period of use. While two directly opposing guide sheaves lying in a common plane might serve a limited purpose as guides for the electrode wire, problems can arise with that arrangement such as a tendency toward binding in the sheave grooves or a tendency to dislodge the wire from such grooves, which problems are largely overcome in the illustrated three-sheave arrangement, particularly in the event of a transient over-feed of the wire or in the event of rotation of the workpiece support according to the arrangement shown in Figure 2. More importantly, however, a three-sheave arrangement such as this assures that the axis of the wire will remain in precise relationship to the supporting arm 64 at the point where the wire leaves the guide sheaves 68 and extends directly to the guide sheave 54 or vice versa, thereby assuring precise accuracy in the location of the cut effected by the electrode wire, whereas a two-sheave guide would require a relatively wide groove in order to accommodate the wire before erosion and the wire would have some lateral freedom to move parallel to the axis of the sheaves after the wire has become eroded greatly through use, thereby impairing accuracy and causing difficulty in maintaining a constant spark gap clearance.

Figure 6:
Figure 6 is a sectional view of an electrical brush or contact unit.

In Figure 6 there is shown an electrical brush or contact unit which maintains constant but light frictional restraint on the wire and uniform electrical contact with the wire as it passes through such electrical brush unit. This unit comprises a cartridge such as 52a of cylindrical form having a central bore 52b in one end and having a cover 52c in the opposite end. The cartridge is partially filled with round copper or other electrically conductive balls 52d of small diameter which are compressed into one end of the cartridge by a plunger 52e acted on by a spring 52f which reacts against the cover 52c. The cover 52c has an opening 52c' which is the same size as the opening 52b and is larger in diameter than the diameter of the wire before erosion of the wire. Pressure of the plunger 52e against the shot or balls 52d crowds them against the wire and the sides of the cartridge 52a, thereby to establish good electrical contact between the wire and the cartridge, the cartridge itself in turn then being connected to the spark discharge supply source terminal 44. Changes in diameter of the wire due to erosion do not effect the quality of the electrical contact established nor the degree of resistance imposed. Moreover, the factor of wear in the brush unit is negligible. Electric contact units engaging the wire at both sides of the work assure substantially uniform voltage between the wire and work along the entire length of the slot being cut.

The wire thickness guage 50 is shown in schematic detail in Figure 3 as comprising a differential transformer 50a having a movable core or plunger 50b connected to an upper wheel or roller 50c which bears against the electrode wire 10 supported by a stationary underlying roller 50d. The primary windings of the differential transformer are energized by an alternating current source 50e and the secondary windings thereof are connected through the servo bridge-type detector circuit 90, the output of which is connected to the control windings 92 of the magnetic amplifier 94. Such amplifier includes a bias winding 96 energized by a bias source 98. The output winding 100 of the differential transformer 94 is connected in series with the relay 102 and the energy source 104. The relay 102 has an armature including two switches 102a and 102b. Switch 102b is normally closed and when open interrupts the supply of electric spark discharge energy to the electrode wire. The switch 102a is normally closed and when open interrupts the supply of current to the servomechanism and motors in the apparatus, from the energy source 104. When the diameter of the electrode wire 10 falls below a certain value, the resulting signal from the differential transformer 50a produces a signal in the magnetic amplifier 54 which energizes the relay to open the switches 102a and 102b and thereby take the system out of operation. Suitable warning devices or indicator devices may be incorporated in the control circuits in order to provide audible or prominent visible indication that the electrode wire needs replacing.

In order to reverse the role of the torque-motor driven spools 12 and 14 so that one winds and the other unwinds for a period and vice versa, alternately, such motors, energized from a source 104, are connected with polarities which cause torques tending to turn the respective spools continuously in the opposite directions, both attempting to wind the electrode wire. Moreover, with equal energization both motors will have the same torque. However, the energizing current which flows through one motor at any given time is caused to be greater than that flowing through the other motor at the same time by incorporating in series with the circuit of the latter one of the two resistances 106 and 108 which are alternatively selectable for this purpose by operation of the relay 110 having a switch contactor 110a. When the switch 110a is in the illustrated position, with the relay deenergized, energizing current for the motor 62 by-passes the resistance 108 and flows through the switch contactor and conductor 112, whereas the simultaneous energizing current for the motor 60 flows through the series resistance 106. Under these conditions, the torque of motor 60 will be less than that of motor 62 and the spool 14 will wind and the spool 12 will unwind. However, when the relay 110 becomes energized, a circuit is formed through conductor 114 by-passing the series resistance 106, so that the energizing current flowing through motor 60 now exceeds that flowing through motor 62 and the spool 12 winds and the spool 14 unwinds. By making the series resistances 106 and 108 equal in value, the torque difference between the motors is the same regardless of which spool is winding and which unwinding, thereby placing the electrode wire 10 under predetermined constant tension at all times, said tension being established at the appropriate value by proper choice of size of the resistances 106 and 108 or by other suitable design provision in connection with the torque motors.

Control of the relay 110 may be placed under different alternative means, such as means for sensing the point when a given amount of wire has been wound on one spool and unwound from another and vice versa, thereby to reverse the direction of movement of the wire when it is nearly unwound from either spool, or by the illustrated means including a timing switch 116 which operates automatically whenever the switch 102a is closed. The timing switch establishes a definite timing interval which is of equal duration for the condition of deenergization of relay 110 as it is for the energization of such relay. With this latter arrangement, involving equal time intervals in the reverse switching, because the torque motors cause winding and unwinding to occur at approximately the same speed at all times, there will be a sufficiently accurate relationship between the switching intervals effected by the timer 116 and the condition of the spools 12 and 14 in terms of the amount of wire which is wound and unwound, so that the wire is permitted to run nearly to its end in unwinding from a spool before the spools are reversed.

The illustrated arrangement for controlling the servomotors 30 and 32 which advance the carriage comprises one in which the output of the direct current pulse generator 118 which energized the work electrode through terminals 42 and 44 for creating electric spark discharges will also provide the energy for the servomotors. This is done through a resistance 120 which bridges between the supply electrodes 42 and 44 and has a variable tap 122. The armatures of direct current motors 30 and 32 are connected in parallel, with one side thereof extending to the variable tap or contactor 122 and the opposite side thereof extending to a contactor 124 associated with the variable direct voltage supply 126. The positive terminal of the direct current source 126 is connected to one side of the resistance 120 and to corresponding sides of the field windings 30a and 30b of the direct current motors. The negative side of the power supply 126 is connected to the opposite sides of the parallel-connected windings 30a and 30b. The effect of this circuit arrangement is to energize the two direct current motors in proportion to the average difference between the potentials at contacts 122 and 124 respectively which is equal to the average between the steady potential at contact 124 and the average of the impulse potentials at contact 122. These contactors are so relatively adjusted that the motors 30 and 32 will receive no energization when the effective spark gap clearance or distance between the electrode wire 10 and the opposing erosion surfaces of the work is precisely correct. Consequently, if the spark gap distance increases above this value, the spark discharge voltage will increase, that is, a greater proportion of the total drop in the series circuit comprising the power supply 118 and the electrodes in series with the spark gap will increase and there will be a tendency for the motors 30 and 32 to drive the electrode wire ahead, i.e., towards the work. The velocity of such wire advance will be dependent upon the difference between the desired spark gap distance and the actual value in excess of that distance. Conversely, if the spark gap decreases below the desired value, there will be a reverse relationship of the potentials at contacts 122 and 124 and the motors 30 and 32 will be energized in the opposite direction tending to withdraw the electrode wire 10 from the erodible surface in the work. Thus the circuit automatically maintains a predetermined spark gap distance as the work is progressively being cut by the spark discharge from the electrode wire 10.

Figure 2:
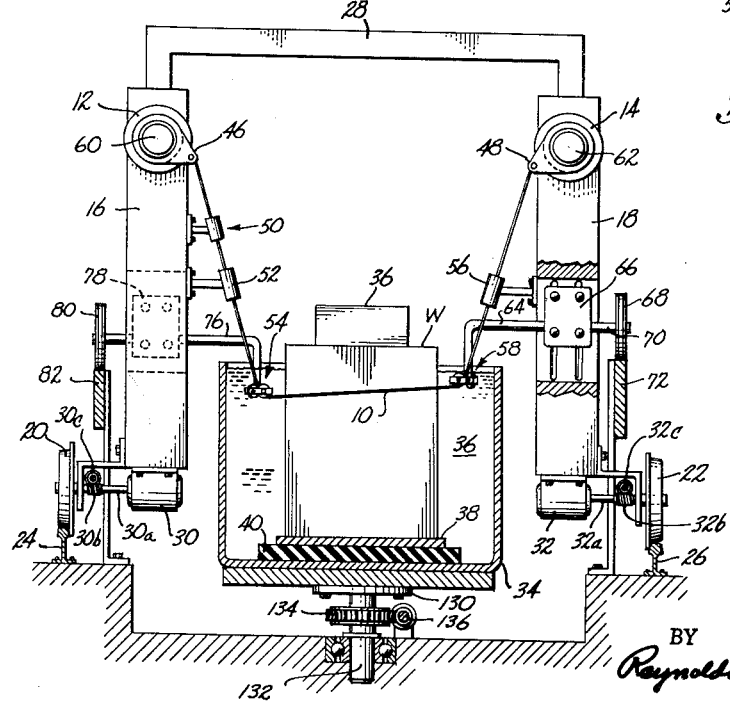
Figure 2 is an end view of such machine with parts shown in section in order to illustrate certain details.

In the illustration shown in Figure 2, the tank 34 is mounted on a turntable 130 which is carried by a vertical shaft 132 carrying a worm wheel 134. A worm 136 engages the wheel 134 in order to turn the tank 34 as and when required in accordance with a selected programming arrangement, such as turning of the worm 136 by suitable means driven by the same torque motors as those which advance the carriage (through a flexible shaft, relay system or otherwise), so as to impart a third degree of slope to the cut being performed by the electrode wire. This programming will be gauged with reference to the template configuration in order to provide precise control over the resulting contour cut in the work.

These and other features and aspects of the apparatus, including modifications and alternative forms, will be evident to those skilled in the art based on the foregoing description of the preferred embodiment.

I claim as my invention:

1. Electric spark discharge metal contouring apparatus comprising, in combination, means supporting a metal workpiece to be contoured and immersing the working region thereof in dielectric liquid, an elongated wire electrode, electrode carriage means including electrode supports at opposite sides of the work supporting means, said electrode supports comprising means upon which the wire is mounted to stretch the same into a straight electrode between said supports in position to engage the working region of the workpiece, means guiding and effecting relative translational feed movement between said carriage means, the wire electrode and the workpiece support progressively in a direction transverse to the stretch of the wire electrode, electric spark energy source means connected operatively between the wire electrode and workpiece to pass electric spark current therebetween, thereby to erode the workpiece ahead of the wire electrode, and means operable to move at least one of said electrode supports in a direction transverse both to the wire electrode stretch and to the line of said advance accompanying such translational movement, thereby to impart predetermined contour to the work being cut by the discharge.

2. The apparatus defined in claim 1, wherein the respective electrode supports comprise reels upon which the respective ends of the wire are wound, and torque motors drivingly connected to the respective reels and alternately operable automatically to wind the wire first on one reel and then on the other during the continued translational feed movement.

3. The apparatus defined in claim 2, including circuit means simultaneously energizing the torque motors in relatively opposing directions of rotation, said circuit means comprising switch means automatically reversible at periodic intervals during continued operation of the apparatus, and torque-reducing means operatively connected alternatively to the respective motors by alternate reversals of said switch means, whereby first one motor and then the other has the greater torque, and whereby the torque difference between motors maintains predetermined tension in the wire.

4. The apparatus defined in claim 1, and means in the workpiece support operable to rotate the workpiece about an axis transverse both to the stretch of the wire electrode and to the direction of translational feed movement.

5. The apparatus defined in claim 1, wherein the respective electrode supports comprise reels upon which the respective ends of the wire are wound, torque motors drivingly connected to the respective reels and alternately operable to wind the wire first on one reel and then on the other, circuit means simultaneously energizing the torque motors in relatively opposing directions of rotation, said circuit means comprising reversible switch means, and torque-reducing means operatively connected alternatively to the respective motors by alternate reversals of said switch means, whereby first one motor and then the other has the greater torque, and whereby the torque difference between motors maintains predetermined tension in the wire.

6. Electric spark discharge metal cutting apparatus comprising, in combination, means supporting a metal workpiece to be cut and immersing the working region thereof in dielectric liquid, an elongated wire electrode, electrode supports comprising reels upon which respectively opposite ends of the wire is wound to stretch the same into a straight electrode between said reels in position to engage the working region of the workpiece, electric spark energy source means connected operatively between the wire electrode and workpiece to pass electric spark current therebetween, thereby to erode the workpiece ahead of the wire electrode, torque motors drivingly connected to the respective reels and alternately operable to wind the wire first on one reel and then on the other, circuit means simultaneously energizing the torque motors in relatively opposing directions of rotation, said circuit means comprising reversible switch means, and torque-reducing means operatively connected alternatively to the respective motors by alternate reversals of said switch means, whereby first one motor and then the other has the greater torque, and whereby the torque difference between motors maintains predetermined tension in the wire.

7. The apparatus defined in claim 6, wherein the electrode supports comprise an electrode carriage, and means guiding and effecting relative translational feed movement between said carriage and the work support progressively in a direction transverse to the stretch of the wire electrode, and means operable at periodic intervals reversing the switch means automatically during continued operation of the apparatus.

8. The apparatus defined in claim 6, and electric brush contact elements connected to the energy source means and in continuous sliding contact with the wire at points located on both sides of the workpiece.

9. The apparatus defined in claim 8, wherein the brush contact elements comprise a container comprising an electrical conductor connected to the energy source, said container having aligned openings in respectively opposite locations therein, to pass the wire electrode therethrough, a plurality of small metallic balls included in said container, and plunger means bearing against said plurality of balls with predetermined force to press the same firmly against and thereby into positive electrical contact with the container conductor and the wire simultaneously.

10. The electric spark discharge apparatus defined in claim 1, wherein the electrode supports comprise means to move the wire electrode lengthwise of itself, and means connecting said source with the wire electrode, including a container comprising an electrical conductor connected to the energy source, said container having aligned openings in respectively opposite locations to pass the wire electrode therethrough, a plurality of small metallic balls included in said container, and plunger means bearing against said plurality of balls with predetermined force to press the same firmly against and thereby into positive electrical contact with the container conductor and the wire simultaneously.

11. Electric spark discharge metal cutting apparatus comprising, in combination, means supporting a metal workpiece to be cut and immersing the working region thereof in dielectric liquid, an elongated wire electrode, electrode supports comprising reels upon which respectively opposite ends of the wire is wound to stretch the same into a straight electrode between said reels in position to engage the working region of the workpiece and the workpiece support progressively in a direction transverse to the stretch of the wire electrode, electric spark energy source means connected operatively between the wire electrode and workpiece to pass electric spark current therebetween, thereby to erode the workpiece ahead of the wire electrode, torque motors drivingly connected to the respective reels and alternately operable to wind the wire first on one reel and then on the other, circuit means simultaneously energizing the torque motors in relatively opposing directions of rotation, said circuit means comprising reversible switch means, means forming an energy source for said torque motors, connected in energizing circuits therewith, and electrical resistance means alternatively connected in the respective energizing circuits for said motors to reduce the energizing current first of one motor and then of the other below that of such other motor, alternately, whereby first one motor and then the other has the greater torque, and whereby the torque difference between motors maintains predetermined tension in the wire.

12. Electric spark discharge metal contouring apparatus comprising, in combination, means supporting a metal workpiece to be contoured and immersing the working region thereof in dielectric liquid, an elongated wire electrode, electrode carriage means including electrode supports at opposite sides of the work supporting means, said electrode supports comprising means upon which respectively opposite ends of the wire are mounted to stretch therebetween, guide members mounted on said carriage means, stationed at respectively opposite sides of the workpiece and guiding the wire to stretch the same into a straight electrode in position to engage the working region of the workpiece, means guiding and effecting relative translational feed movement between said carriage means, the wire electrode and the workpiece support progressively in a direction transverse to the stretch of the wire electrode, electric spark energy source means connected operatively between the wire electrode and workpiece, to pass electric spark current therebetween, thereby to erode the workpiece ahead of the wire electrode, and means operable to move said electrode guide members in a direction transverse both to the wire electrode and to the line of said direction of progressive relative movement, said tracer means carrying said guide members mounted on respectively opposite sides of said carriage means to permit such movement of said guide members, and control template means engaged by said tracer means and mounted in fixed relation to the workpiece support, thereby to control the contour of the cut being made by the wire electrode in accordance with the shape of said template means.

13. The apparatus defined in claim 12, wherein the tracer means comprises three equitrilaterally arranged sheaves rotationally mounted thereon and defining a wire passageway in common tangency to the three sheaves, the sheaves being relatively movable toward and from the wire passing therebetween, and spring means urging the sheaves into guiding contact with the wire.

14. The apparatus defined in claim 13, wherein tracer means comprise rollers riding on the templates to follow the contour thereof, said rollers and templates having magnetic means maintaining the rollers continuously on the templates to follow the curvature thereof.

15. The apparatus defined in claim 14, wherein the electrode support means upon which respectively opposite ends of the wire are mounted comprise reels rotatively mounted on the carriage independently of the tracer means, torque motors drivingly connected to the respective reels and alternately operable to wind the wire first on one reel and then on the other, circuit means simultaneously energizing the torque motors in relatively opposing directions of rotation, said circuit means comprising reversible switch means, and torque-reducing means operatively connected alternatively to the respective motors by alternate reversals of said switch means, whereby first one motor and then the other has the greater torque, and whereby the torque difference between motors maintains predetermined tension in the wire.

16. The apparatus defined in claim 15, and thickness gauge means continuously in engagement with the electrode wire, including means connected to the energy source and carriage means and response to a reduction of thickness thereof below a predetermined value to interrupt operation of the apparatus.

References Cited in the file of this patent

UNITED STATES PATENTS

| | | |
|---|---|---|
| 2,019,971 | Hopkins | Nov. 5, 1935 |
| 2,068,043 | Warnke | Jan. 19, 1937 |
| 2,794,110 | Griffith | May 28, 1957 |